Figure 1:
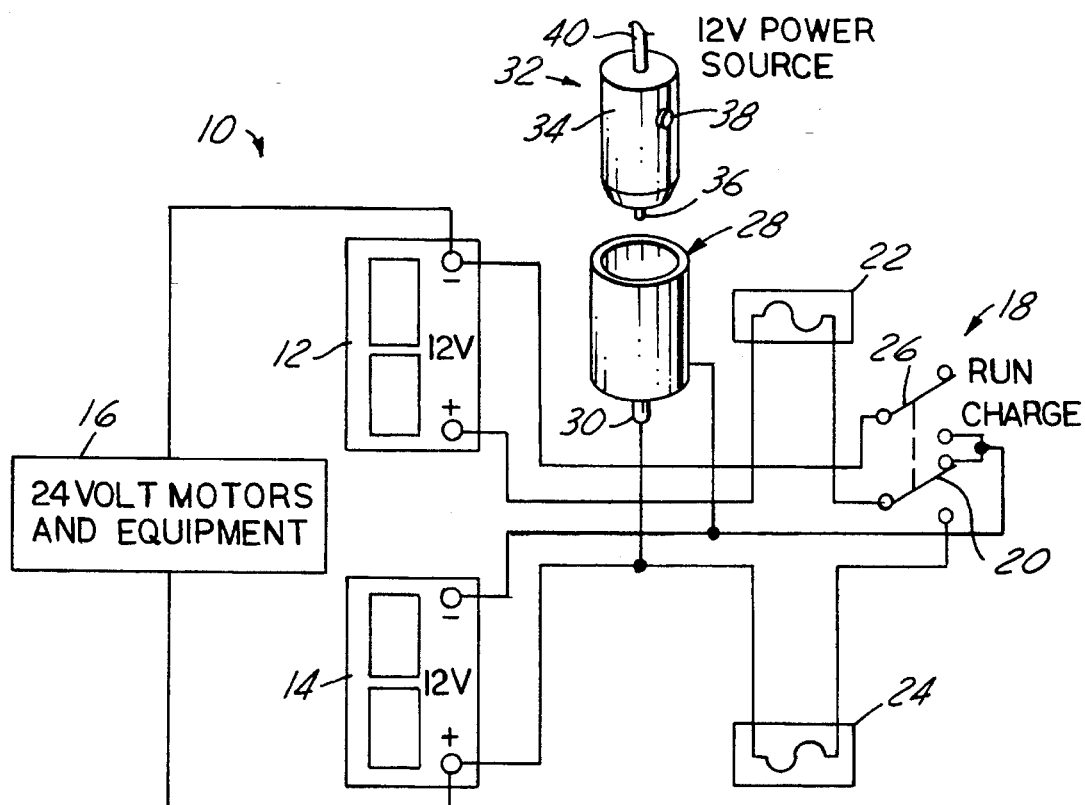

United States Patent [19]

Drouillard et al.

[11] Patent Number: 5,497,066
[45] Date of Patent: Mar. 5, 1996

[54] BATTERY BOOSTER SYSTEM

[75] Inventors: John R. Drouillard, Romulus; James E. Drouillard, Westland, both of Mich.

[73] Assignee: D & D Advanced Technologies, Inc., Romulus, Mich.

[21] Appl. No.: 200,436

[22] Filed: Feb. 23, 1994

[51] Int. Cl.⁶ .................................................. H02J 7/00
[52] U.S. Cl. ...................... 320/7; 320/5; 320/6; 320/15; 320/16
[58] Field of Search .................................. 320/5, 6, 7, 15, 320/16

[56] References Cited

U.S. PATENT DOCUMENTS

| | | | |
|---|---|---|---|
| 3,694,729 | 9/1972 | Jones | 307/150 |
| 3,718,848 | 2/1973 | Hines | 320/7 |
| 3,838,327 | 9/1974 | Uemichi et al. | 320/15 X |
| 3,928,791 | 12/1975 | Mullersman | 320/7 |
| 4,081,738 | 3/1978 | Roller | 320/7 |
| 4,114,082 | 9/1978 | Scheidler | 320/7 |
| 4,139,812 | 2/1979 | Huggins | 320/7 |
| 4,297,629 | 10/1981 | Godard et al. | 320/7 |
| 4,540,929 | 9/1985 | Binkley | 320/7 X |
| 4,649,332 | 3/1987 | Bell | 320/7 |
| 5,083,076 | 1/1992 | Scott | 320/7 X |
| 5,233,282 | 8/1993 | Iwashita | 320/7 |

FOREIGN PATENT DOCUMENTS 2089592  6/1982  United Kingdom ............. 320/7

*Primary Examiner*—Peter S. Wong
*Assistant Examiner*—Patrick Law
*Attorney, Agent, or Firm*—Barnes, Kisselle, Raisch, Choate, Whittemoe & Hulbert

[57] ABSTRACT

A battery booster for a wheelchair electrical system powered by two twelve volt batteries that includes a twelve volt power socket of conventional standardized configuration for receiving battery-boosting power from a twelve volt power source such as a vehicle cigarette lighter. Power received at the socket charges the wheelchair batteries either through a switch for selectively connecting the batteries in series for operation or parallel for charging, or through a timer and relay arrangement for automatically charging the batteries in alternating sequence.

2 Claims, 1 Drawing Sheet

BATTERY BOOSTER SYSTEM

The present invention is directed to a circuit for boosting the charge in two twelve volt batteries of a wheelchair or the like.

To supply power to the motors, computer and other equipment on an electric wheelchair, for example, two twelve volt batteries are conventionally connected in series to form a twenty-four volt d.c. power source. A general object of the present invention is to provide a system for boosting battery power when the power system is not in use, such as when the wheelchair is being transported by automobile or the like. In this connection, another and more specific object of the present invention is to provide a battery booster system that draws power from the twelve volt vehicle electrical system for boosting charge in the wheelchair batteries when the wheelchair is not in use. Yet another object of the present invention is to provide a battery booster system of the described character in which boosting power is applied through a standard twelve volt socket, which is available during normal operation for powering accessories such as video cameras from the wheelchair electrical power system. Another object of the invention is to provide a battery booster system of the described character that operates automatically without operator intervention.

Figure 2:
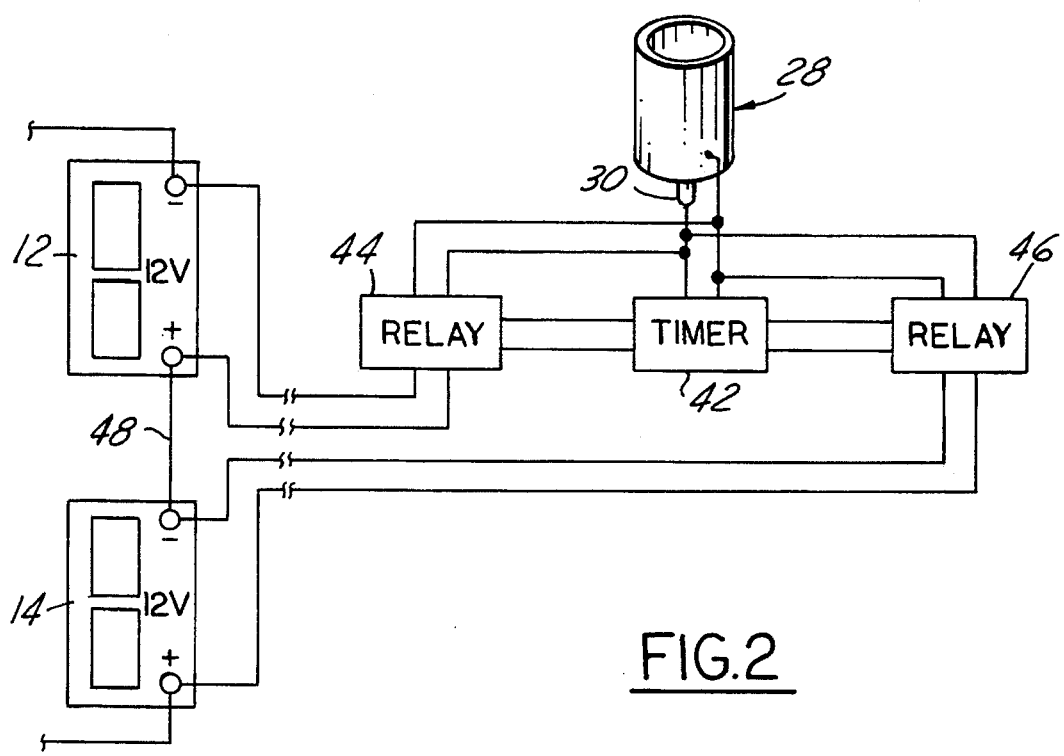

The invention, together with additional objects, features and advantages thereof, will be best understood from the following description, the appended claims and the accompanying drawings in which:

FIG. 1 is an electrical schematic diagram of an electrical power system that includes a battery booster in accordance with one presently preferred embodiment of the invention; and FIG. 2 is a fragmentary schematic diagram that illustrates a modification to the battery booster of FIG. 1.

FIG. 1 illustrates an electrical power system 10 for applying power to a wheelchair from a pair of twelve volt batteries 12,14. The negative terminal of battery 12 and the positive terminal of battery 14 are connected to the twenty-four volt motors, computer and other equipment 16 of the wheelchair for applying twenty-four volt d.c. power thereto when batteries 12,14 are connected in series. A double-pole double-throw electrical switch 18 has a first pole 20 with a common contact connected through a fuse 22 to the positive terminal of battery 12, a normally closed contact connected to the negative terminal of battery 14, and a normally open contact connected through a fuse 24 to the positive terminal of battery 14. A second pole 26 of switch 18 has a common contact connected to the negative terminal of battery 12, and a normally open contact connected to the negative terminal of battery 14. Preferably, switch 18 is a manual switch responsive to operator activation for switching poles 20,26 simultaneously between a first or "RUN" position illustrated in FIG. 1, and a second or "CHARGE" position.

A twelve volt power socket 28 of standard and conventional configuration has a power terminal 30 connected to the positive terminal of battery 14 and a negative terminal connected to the negative terminal battery 14. A power cable 32 has a standard twelve volt power plug 34 adapted to be removably inserted into socket 28 so that the power terminal 36 of plug 34 connects with positive terminal 30 of socket 28, and the negative terminal 38 of plug 34 connects with the negative terminal of socket 28. Plug 34 is connected by a cable 40 to a suitable plug for insertion into an automobile cigarette lighter.

In the RUN position of switch 18, the positive terminal of battery 12 is connected through fuse 22 and switch pole 20 to the negative terminal of battery 14, so that the batteries are connected in series and apply twenty-four volt power to motors and equipment 16. On the other hand, when switch 18 is in the CHARGE position, this series connection is broken, and the batteries are connected in parallel through the switch. That is, the negative terminal of battery 12 is connected through switch pole 26 to the negative terminal battery 14, and the positive terminal of battery 12 is connected through fuse 22, switch pole 20 and fuse 24 to the positive terminal of battery 14. In this position, twelve volt power applied to socket 28 from plug 34 is fed to both batteries 12,14 in parallel so as to boost battery power. It will be noted that connection of socket 28 across battery 14 independent of switch 18 makes socket 28 available for powering external twelve volt devices when switch 18 is in the RUN mode of operation and batteries 12,14 power equipment 16.

FIG. 2 illustrates a modified embodiment of the invention for automatically applying battery-boosting power to batteries 12,14 without operator intervention when twelve volt power is applied to socket 28. The positive and negative terminals of socket 28 are connected to a timer 42, and to the switch contacts of a pair of relays 44,46 in parallel. Timer 42 provides electrical control signals to the control coils of relays 44,46. The switch contacts of relay 44 selectively connect the power terminals of socket 28 to the power terminals of battery 12. Likewise, the switch contacts of relay 46 selectively connect the power terminals of socket 28 to the power terminals of battery 14. A jumper 48 connects the positive terminal of battery 12 to the negative terminal of battery 14, so that batteries 12,14 are continuously connected in series in this embodiment of the invention. When twelve volt power is applied to socket 28 by power cord 32 (FIG. 1), timer 42 is automatically activated. Timer 42 functions upon receipt of such power from socket 28 to activate relays 44,46 alternately in sequence, so that the electrical power at socket 28 is alternately connected to batteries 12,14. In this way, power is boosted at both batteries without requiring an operator to remember to switch to the CHARGE mode of operation.

The battery booster system of the present invention may be packaged in a small and compact enclosure that can be readily and unobtrusively fitted onto a wheelchair or other powered device.

We claim:

1. In an electrical power system that includes a pair of twelve volt batteries connected to twenty-four volt equipment, a battery power booster system for charging said batteries comprising:

electrical switch means coupled to said batteries for alternately connecting said batteries in series to supply twenty-four volt power to the twenty-four volt equipment in a first switch position or in parallel for charging in a second switch position, a twelve volt power socket connected across one of said batteries independent of said switch means and across the other of said batteries through said switch means when said switch means is in said second position, said twenty-four volt equipment being connected to said batteries independent of said power socket, and means including a twelve volt power plug removably insertable into said socket for connecting said socket to a source of twelve volt charging power, said socket being available for supplying twelve volt power to twelve volt equipment external to said power system and separate from said twenty-four volt equipment when said switch is in said first position by reason of said socket being connected across said one of said batteries independent of both said switch means and said twenty-four volt equipment.

2. The system set forth in claim 1 wherein said electrical switch means comprises manually operable switch means.

* * * * *